United States Patent [19]

Lin

[11] Patent Number: 4,741,322

[45] Date of Patent: May 3, 1988

[54] ASH CATCH TRAY FOR BARBECUE KETTLE

[76] Inventor: Patrick Lin, 12th Fl., No. 1034, Min Sheng East Rd., Taipei, Taiwan

[21] Appl. No.: 77,186

[22] Filed: Jul. 21, 1987

[51] Int. Cl.4 .............................................. F24B 3/00
[52] U.S. Cl. .................................. 126/25 R; 126/242
[58] Field of Search ...................... 126/25 R, 242, 243

[56] References Cited

U.S. PATENT DOCUMENTS 4,576,140   3/1986   Schlosser ........................... 126/25 R

*Primary Examiner*—Carroll B. Dority, Jr.
*Attorney, Agent, or Firm*—Burns, Doane, Swecker & Mathis

[57] ABSTRACT

A knockdown type ash catch tray in the shape of a round plate that can be easily mounted and dismounted on the legs of a barbecue kettle, particularly a charcoal kettle. The outer edges of the plate are downwardly folded to form a folded side provided on the circumference thereof with the same number of mounting holes as the legs of the barbecue kettle. Each mounting hole having the profile of an L-shape includes a fitting hole portion at one end thereof, a guiding hole portion at the middle thereof and a hanging hole portion at the other end thereof. These hole portions are arranged in communicating with one another. By aligning the mounting holes on the ash catch tray respectively with the studs provided at a predetermined height on the corresponding inner sides of the legs of the barbecue kettle and turning the tray in one direction, the ash catch tray can be easily engaged with the studs and supported in position on the legs of the kettle. When turning the tray in the reverse direction, the mounting holes can be released from engagement with the studs and thus dismounted from the legs of the barbecue kettle.

2 Claims, 2 Drawing Sheets

ASH CATCH TRAY FOR BARBECUE KETTLE

The present invention relates to an ash catch tray for barbecue kettle, and more particularly, to a knockdown type ash catch tray having on its perimeter a plurality of L-shaped holes adapted to be easily hooked on and retained in engagement by the respective protruding studs mounted on the legs of the kettle.

Conventionally, an ash catch tray for barbecue kettle is provided with a plurality of round holes whereby the tray is slipped over the upper portions of the legs of the barbecue kettle and secured in place thereon. When the tray is desired to be removed from or fitted again after it has been removed, onto the legs of barbecue kettle, it is necessary that the legs be first dismounted from the kettle body and the dismounting work is quite troublesome. In order to eliminate such drawbacks, recent barbecue kettles are so designed that mouths of the round holes in the ash catch tray become open which lead into the figure "6" shaped open holes at the outer margins of the tray. By such an arrangement, the open holes need only to be aligned with the respective legs and by lifting the ash catch tray from below upward and turning it round slightly, it is possible to fix the tray on the upper portions of the legs. However, since the openings of the open holes are located at the outer periphery, this ash catch tray also drops in sturdiness and during dismantling it is likely to become deformed in shape. In recent years, Weber-Stephen Products Company in U.S.A. has put out a type of ash catch tray with improved design and according to which, sections of steel wire are provided at different places on the lower side of the circumference of the ash catch tray and by said steel wire the tray is tied to the barbecue kettle legs. Although by the design the sturdiness of the tray improves drastically, it is however time-consuming when the tray is to be dismounted and also positioning of the tray on the legs is inconvenient, it is particularly difficult at leveling of the tray, hence a still imperfect design.

Accordingly, it is the object of the invention to provide for use in the barbecue kettle an ash catch tray having folded edges on the circumference, by the L-shaped open holes provided in said folded edges enabling the tray to be slipped onto the respective protruding studs mounted on the inner sides of the barbecue kettle legs and firmly engaged thereto and whereby the ash catch tray can be easily dismounted and is of increased sturdiness.

The easily dismountable ash catch tray of the invention is in the shape of a round plate, the outer edges of which extend downward to form a folded edge. The peripheral area of this folded edge has a plurality of mounting holes in the profile of an L-shape. Each of these holes comprises a fitting hole portion, a guiding hole portion and a hanging hole portion. These hole portions have the respective lower edges in uniform level along the circumference of the tray and are in communication with one another. Of the constituent hole portions in a mounting hole, the fitting hole portion has the largest width, its upper edge extending beyond the upper fringe of the folded edge to the upper surface of the ash catch tray. The guiding hole portion is horizontal extending along the circumference of the tray and communicates with the fitting and hanging hole portions at the lower sides thereof. Width of the hanging hole portion is the same as that of the guiding hole portion but smaller than that of the fitting hole portion, and its upper edge extends beyond the upper edge of the guiding hole portion. In mounting the ash catch tray on a barbecue kettle legs, the tray is slipped by its fitting hole portions from below upward over the outer circumferences of the protruding studs suitably provided on the corresponding inner side of the legs of the kettle. Next, the ash catch tray is turned round to allow each guiding hole portion to slip on the smaller diameter neck of the respective stud till the terminal edge of the guiding hole portion touches the neck, when the ash catch tray is loosened from further turning. In this way, each hanging hole portion is locked on the neck of the respective stud thereby permitting the ash catch tray to be firmly secured in place.

The invention, both as to its construction and its mode of use, will be better understood by reference to the following disclosure and drawings forming a part thereof, wherein.

Figure 1:
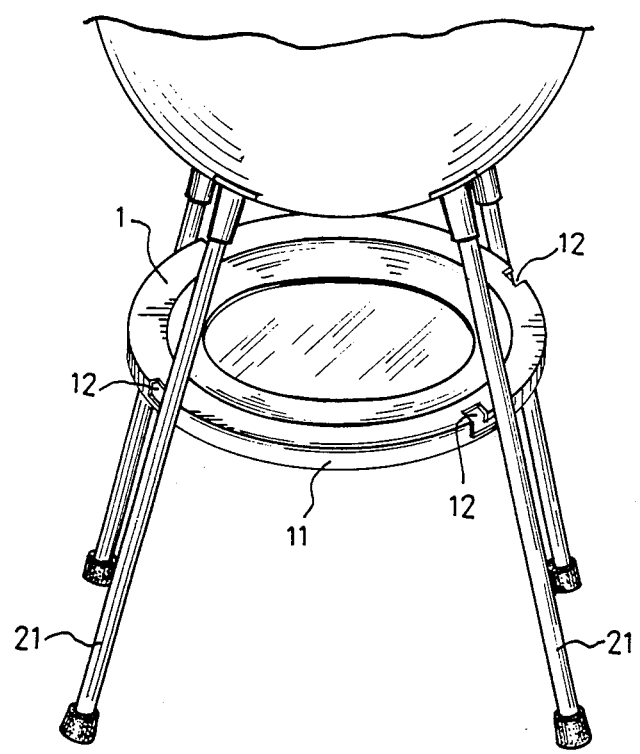
FIG. 1 is a perspective view of a barbecue kettle with which an ash catch tray of the present invention is employed.
Figure 2:
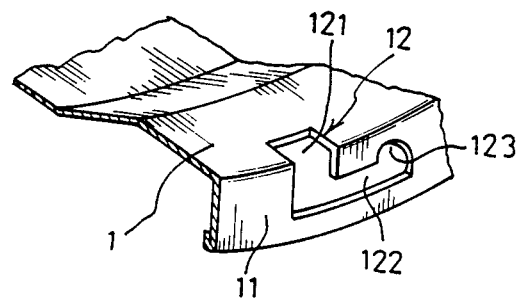
FIG. 2 is an enlarged partial perspective view of the ash catch tray of the invention showing the mounting hole.
Figure 3:
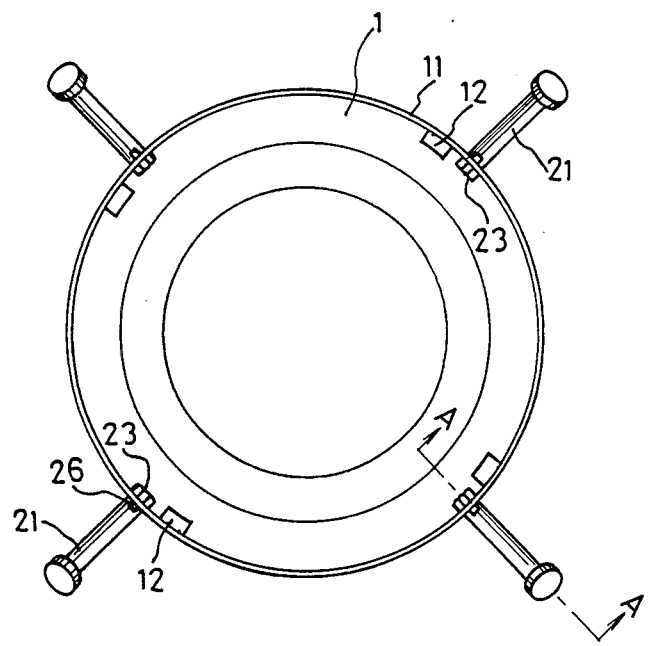
FIG. 3 is a cross sectional bottom view of the ash catch tray of FIG. 1.
Figure 4:
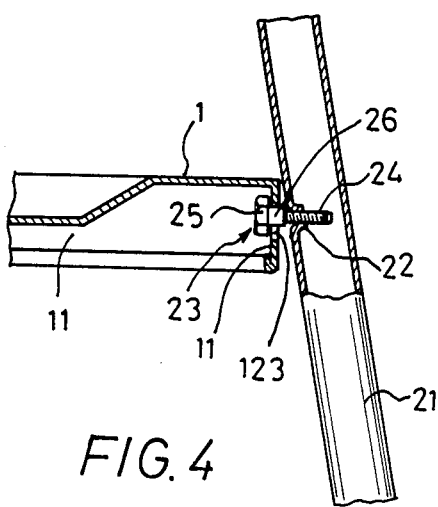
FIG. 4 is an enlarged view taken in cross-section along the line A—A of FIG. 2.

Referring now to FIGS. 1 through 4, an ash catch tray of the invention indicated generally by the reference numeral 1 shows the shape of a round plate with a recess in the middle for catching ash, its outer edges folding downwardly to form an annular folded side or edge 11. At appropriate places on the periphery of the folded edge 11 are defined a plurality of mounting holes 12, the number of which is same as that of the support legs 21 in a barbecue kettle (not shown) and in the embodiment shown in the drawings, the mounting holes 12 and the legs 21 are respectively four in number and are arranged in an equal space along the periphery, i.e. having a central angle of 90 degree to each other.

The profile of the mounting holes 12 defines an L-shape, each of which includes in sequence a fitting hole portion 121, a guiding hole portion 122 and a hanging hole portion 123 communicating with one another. The lower edges of the fitting hole portion 121, guiding hole portion 122 and hanging hole portion 123 are formed substantially in a continual straight line along the periphery of the folded edge 11 and are parallel with the upper and lower sides of the folded edge 11. Of the three hole portions that constitute a mounting hole 12, the fitting hole portion 121 has the larger width and its upper edge goes beyond the upper side edge of the folded side 11 to extend radially to an appropriate distance on the upper surface of the ash catch tray. The guiding hole portion 122 is smaller in width and communicates horizontally with the fitting hole portion 121 on one side and the hanging hole portion 123 on the other at the lower sides of the latter. As for the hanging hole portion 123, it is more or less similar in width to the guiding hole portion 122, and the upper edge thereof raises up from the upper edge of the guiding hole portion 122. In the embodiment shown in the drawings, the fitting hole portion 121, the guiding hole portion 122 and the hanging hole portion 123 are arranged in the counterclockwise direction on the folded side 11; however, the reverse will also do.

In adapting to the construction of the ash catch tray 1, the legs 21 of the barbecue kettle are respectively provided at a predetermined height on the inner side upper part thereof with a screw hole 22 for insertion of a stud 23 by its threaded portion 24 and thus fixed therein with the head 25 protruding outwardly from the leg 21. The head 25 of the screw 23 has a diameter greater than the width of the guiding hole portion 122 and hanging hole portion 123 and a neck portion 26 formed between the head 25 and the threaded portion 24 and having a diameter smaller than the width of the guiding hole portion 122 and the hanging hole portion 123.

In order to mount the ash catch tray of the invention onto legs 21 of a charcoal barbecue kettle, the ash catch tray 1 is mounted in a way that the fitting hole portions 121 of mounting holes 12 are respectively aligned with the corresponding studs 23 on the legs 21. The ash catch tray 1 is raised from below upward so that each fitting hole portion 121 will allow the head 25 and the neck portion 26 of a stud 23 to pass through. The ash catch tray 1 is then turned in a clockwise direction whereby the neck portion 26 of each stud 23 is led into the guiding hole portion 122 and guided by the guiding hole portion 122 toward the hanging hole portion 123. Until the end of each hanging hole portion 123 contacts the neck portion 26 of each stud 23, the ash catch tray 1 is then loosened from further turning whereby the tray falls down immediately and by this action the upper edge of each hanging hole portion 123 engages with the neck portion 26 of each stud 23 and the head 25 of each stud 23 is now located on the inner surface of the folded side 11. Since the diameter of the head 25 of the stud 23 is larger than the width of the guiding hole portion 122 and the hanging hole portion 123, the ash catch tray will be safely mounted on the studs 23.

When the ash catch tray is to be dismounted from the barbecue kettle in order to dispose of the ash collected therein, all that has to do is to proceed in a reverse manner of the procedure described above. In other word, the ash catch tray is turned in counterclockwise direction until the neck portion 26 of each stud 23 comes into the fitting hole portion 121 from the hanging hole portion 123 through the guiding hole portion 122. Next, by lowering down the tray, the mounting holes 12 are thus released from engagement with the respective studs 23 and the tray can thereby be removed from the legs of the barbecue kettle.

Having constructed in accordance with the principle of the invention, the ash catch tray can be conveniently used with a charcoal barbecue kettle and the mounting and dismounting of which is so easy and fast and without the need of any tools or loosening the studs, the ash catch tray can thus be proved to be a very useful utensil.

I claim:

1. A dismountable ash catch tray for barbecue kettle which has a plurality of support legs each having a stud fixed on the inside wall of the corresponding leg at a predetermined height of the leg, comprising a round plate having a recess in the middle portion thereof for catching ash and having its outer circumference folded downwardly to form a ring-shaped folded side, said folded side provided on the circumference thereof with a plurality of mounting holes corresponding in number to said legs of the barbecue kettle and each of said mounting hole having the profile of an L-shape and comrpising in sequence a fitting hole portion having its upper part extending radially to the upper face and large enough to allow said stud to pass through, a guiding hole portion communicating with said fitting hole portion at one side lower part thereof and horizontally extending along the circumference of said folded side and a hanging hole portion communicating with said guiding hole portion at one end and having an upwardly extending hole edge for engaging with said stud.

2. A dismountable ash catch tray for barbecue kettle according to claim 1, wherein said studs each includes a head portion smaller in diameter than said fitting hole portion but larger than said guiding hole portion and said hanging hole portion, a neck portion smaller in diameter than said guiding hole portion and a threaded portion smaller in diameter than said guiding hole portion and screwed through a threaded hole in said leg of the barbecue kettle.

* * * * *